United States Patent [19]
Heytmeijer

[11] 3,864,274
[45] Feb. 4, 1975

[54] METHOD OF PRODUCING HALOPHOSPHATE PHOSPHOR UTILIZING EXTREMELY RAPID PRECIPITATION OF CALCIUM HYDROGEN ORTHOPHOSPHATE

[75] Inventor: Herman R. Heytmeijer, Whippany, N.J.

[73] Assignee: Westinghouse Electric Corporation, Pittsburgh, Pa.

[22] Filed: Mar. 27, 1973

[21] Appl. No.: 345,173

[52] U.S. Cl............................ 252/301.4 P, 423/308
[51] Int. Cl. ...................... C09k 1/36, C01b 25/32
[58] Field of Search ............... 252/301.4 P, 301.6 P; 423/308, 307

[56] References Cited
UNITED STATES PATENTS

| | | | |
|---|---|---|---|
| 3,099,627 | 7/1963 | Mooney et al. | 252/301.4 P |
| 3,395,979 | 8/1968 | Schafer | 423/308 |
| 3,420,625 | 1/1969 | Margolis | 423/308 X |
| 3,505,012 | 4/1970 | Dale et al. | 423/308 |

Primary Examiner—Jack Cooper
Attorney, Agent, or Firm—R. A. Stoltz

[57] ABSTRACT

An improved method of production of calcium halophosphate phosphor utilizing an extremely rapid batch precipitation of calcium hydrogen orthophosphate. Stoichiometric proportions of calcium chloride (or calcium nitrate) and diammonium phosphate solutions are mixed in less than 10 seconds to form an unusual thickened mixture which is viscous and slimy in appearance. The thickened mixture is stirred for at least 4 minutes,, during which time the slurry thins out. Preferably the mixing continues for a sufficient time that a constant pH is achieved, typically approximately ten minutes. Calcium hydrogen orthophosphate di-hydrate crystals of superior crystallinity are obtained and this provides superior crystallinity in the resulting halophosphate phosphors. The di-hydrate crystals are separated, converted to anhydrous crystals by heating and stirring in an acid solution until a temperature of about 95°C is reached. A raw mix containing the anhydrous crystals is prepared and fired to form the halophosphate phosphor.

3 Claims, No Drawings

METHOD OF PRODUCING HALOPHOSPHATE PHOSPHOR UTILIZING EXTREMELY RAPID PRECIPITATION OF CALCIUM HYDROGEN ORTHOPHOSPHATE

CROSS-REFERENCE TO RELATED APPLICATION

In copending application Ser. No. 345,390, filed concurrently herewith and owned by the present assignee is described a process for the preparation of halophosphate phosphors in which precipitated calcium hydrogen orthophosphate crystals are compacted in order to control the crystal size of the final phosphor.

BACKGROUND OF THE INVENTION

This invention relates to the manufacture of phosphors such as used in fluorescent lamps, and more particularly to the well known halophosphate phosphors.

Typically, halophosphate phosphors have been prepared by firing a raw mix containing calcium hydrogen orthophosphate de-hydrate, calcium carbonate, calcium halides, ammonium chloride and suitable compounds of activator metals. The calcium halides are generally chlorides and fluorides, and these activators are generally antimony and manganese. It is well known to substitute other alkaline earth metals for some or all of the calcium. It is also well known that in the preparation of such phosphors, the crystallinity of the phosphor is critically dependent upon the crystallinity of the calcium hydrogen orthophosphate precipitate and that good crystallinity in the phosphor is essential to good lamp performance. In order to prepare calcium hydrogen orthophosphate having adequate crystallinity, the prior art has indicated that calcium chloride and diammonium phosphate solutions should be mixed slowly. Such slow mixing is taught in U.S. Pat. No. 3,242,369, issued to King et al. on Mar. 6, 1966. Slow mixing is also taught in U.S. Pat. No. 3,635,660 issued to Bruce et al. on Jan. 18, 1972. Such methods do not produce an intermediate slurry, but form the calcium hydrogen orthophosphate di-hydrate crystals directly.

SUMMARY OF THE INVENTION

It has been discovered that halophosphate phosphor of superior crystallinity can be produced by using calcium hydrogen orthophosphate which is precipitated using extremely rapid mixing of solutions of calcium chloride (or calcium nitrate) and diammonium phosphate. Approximately, stoichiometric amounts of the solutions are mixed in less than ten seconds, resulting in the formation of an intermediate slurry which is a thickened mixture of relatively high viscosity and slimy appearance. This thickened mixture is stirred for at least 4 minutes, during which time the mixture thins out and a crystalline precipitate is formed. The crystalline precipitate is separated, then stirred in an acid solution (pH typically about 4.5) heated to about 95°C to convert the di-hydrate crystals to anhydrous crystals. The anhydrous crystals are then used in a raw mix which is fired to form a halophosphate phosphor of superior crystallinity.

DESCRIPTION OF THE PREFERRED EMBODIMENTS

Approximately stoichiometric proportions of diammonium phosphate and calcium chlorides are to be mixed extremely rapidly. This can be done by adding either solution to the other or pouring both solutions in a mixing vessel. These solutions are combined in 10 seconds or less and typically about 5 seconds. An unusual thickened mixture results. This mixture is continuously stirred for at least about 4 minutes, during which time the crystals are formed and the mixture thins out. Illustrative of the fact that a somewhat different reaction is occurring is the fact that, when identical solutions are mixed, a different pH is obtained when the solutions are combined rapidly (as opposed to when the solutions are combined slowly). Calcium nitrate can be used in place of the calcium chloride, but calcium chloride is preferred.

The following procedure is illustrative of the slow mixing of the prior art. A half molar solution of diammonium phosphate was added under strong agitation and at a flow rate of 60 milliliters (ml) per minute to a vessel containing 1,800 ml of half molar calcium chloride solution until approximately 1,760 ml of diammonium phosphate have been added. The mixture reached a final pH value of 5.5 upon completion of the calcium hydrogen orthophosphate precipitation. The precipitate was then filtered off, washed, and converted to the anhydrous form by slurrying in a solution containing 3,300 ml of deionized water and 3 ml of concentrated phosphoric acid. The conversion was accomplished by heating the slurry to a temperature of approximately 95°C in approximately 40 minutes.

When the same half molar reactants were rapidly combined in about 5 seconds, a final pH of 5.86 was obtained, as compared to 5.5 obtained by slow combination of reactants. The precipitate, after being allowed to fully crystallize during 10 minutes of additional stirring, was similarly filtered, washed and converted. The crystals formed by rapid combination of the reactants resulted in crystals of superior crystallinity, having crystals which are thin and whose two larger dimensions generally form a square, as desired.

The crystals produced by slow combination of the reactant resulted in plate-like crystals having the two larger dimensions of approximately 7–9 microns and a thickness generally slightly greater than 2 microns. The plate-like crystals formed by the rapid combination of reactants had larger dimensions of approximately 10–13 microns and a thickness of generally less than 2 microns, and also had a surface which, when viewed microscopically, appeared quite smooth and free from surface imperfections. The improved process is relatively fast and can be used to produce considerable quantities, even if the individual precipitation batches are small. The process is equally applicable, however, to much larger precipitation batches. The precipitation temperature is not critical, but the fact that this precipitation step can be conveniently performed at room temperature also helps make production in relatively large quantities practical.

Even though the exact reaction which occurs when the calcium chloride and diammonium phosphate are brought together in an extremely rapid manner is not fully understood, the process is clearly different from the slow combination process of the prior art. Rapid introduction of the reactants results in a thickened intermediate slurry being formed and this intermediate slurry does not occur in slow mixing of the same quantities of the same reactants. The rapid combination of reactants also results in a significantly different pH at the end of precipitation. Both reactants which are mixed are low viscosity solutions having a viscosity similar to that of water. When these reactants are mixed rapidly a thickened mixture is formed which has a viscosity of greater than 500 centipoises. As the stirring is continued and the calcium hydrogen orthophosphate crystals precipitate, the mixture thins out and the liquid portion approaches the viscosity of water.

Conversion to the anhyrous form is performed, for example, by preparing a solution containing about 3.3 milliliters of concentrated phosphoric acid and approximately 3,700 milliliters of demineralized water, and stirring the crystals in the solution and heating to a temperature of about 95°C. The parameters are not critical and other acids (HCl for example) can be used.

The raw mix is prepared in the conventional manner and may contain, for example, the following; 255 grams of $CaHPO_4$ produced according to the instant invention, 21.5 grams of $CaF_2$, 8.8 grams of $Sb_2O_3$, 11 grams of $MnCO_3$, 76.4 grams of $CaCO_3$, 7.65 grams of $NH_4Cl$, and 5.4 grams of CaCl. The raw mix is fired in the conventional manner, for example, at about 1200°C for approximately 3 hours.

The critical element in the instant invention is the extremely rapid combination of the precipitation reactants. Other parameters such as raw mix ingredients and molarity and ratios of precipitation reactants are not critical.

What is claimed is:

1. In a method wherein halophosphate phosphor is prepared by precipitating calcium hydrogen orthophosphate di-hydrate, separating said di-hydrate crystals, converting said calcium di-hydrate crystals to anhydrous calcium hydrogen orthophosphate by stirring said di-hydrate crystals in an acid solution, preparing a raw mix containing said anhydrous calcium hydrogen orthophosphate and firing said raw mix to form said halophosphate phosphor; the improvement which comprises:
    a. precipitating said di-hydrate crystals by mixing solutions of calcium chloride or calcium nitrate and diammonium phosphate in approximately stoichiometric proportions, the entire amount of both of said solutions being combined in less than 10 seconds to form a thickened mixture having a viscosity of greater than 500 centipoises; and
    b. stirring said thickened mixture for at least about four minutes to form a crystalline calcium hydrogen orthophosphate di-hydrate precipitate.

2. The method as specified in claim 1, wherein said thickened mixture is stirred until the pH of said mixture ceases changing.

3. The method as specified in claim 1, wherein said solutions are of calcium chloride and diammonium phosphate and are approximately one-half molar solutions.

* * * * *